United States Patent
Jeong et al.

(10) Patent No.: US 8,396,253 B2
(45) Date of Patent: Mar. 12, 2013

(54) METHOD AND APPARATUS FOR RECOGNIZING LOCATION OF USER

(75) Inventors: Moon-sik Jeong, Seongnam-si (KR); Artem Lutov, Moscow (RU); Sergiy Kravchenko, Kiev (UA); Kyung-sun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 53 days.

(21) Appl. No.: 13/102,485

(22) Filed: May 6, 2011

(65) Prior Publication Data

US 2011/0274316 A1 Nov. 10, 2011

(30) Foreign Application Priority Data

May 7, 2010 (KR) ............... 10-2010-0043058

(51) Int. Cl.
*G06K 9/00* (2006.01)
(52) U.S. Cl. ......... 382/106; 382/118
(58) Field of Classification Search ......... 382/106, 382/118

See application file for complete search history.

(56) References Cited

U.S. PATENT DOCUMENTS

| | | | |
|---|---|---|---|
| 6,927,694 B1* | 8/2005 | Smith et al. | 340/576 |
| 8,045,766 B2* | 10/2011 | Ishida et al. | 382/118 |
| 8,229,089 B2* | 7/2012 | Song et al. | 379/88.16 |
| 2005/0074148 A1* | 4/2005 | Rodyushkin et al. | 382/118 |
| 2005/0094849 A1 | 5/2005 | Sung et al. | |
| 2006/0115157 A1* | 6/2006 | Mori et al. | 382/190 |
| 2007/0122034 A1 | 5/2007 | Maor | |

FOREIGN PATENT DOCUMENTS

KR 1020080114361 12/2008

* cited by examiner

*Primary Examiner* — Tom Y Lu
(74) *Attorney, Agent, or Firm* — The Farrell Law Firm, P.C.

(57) ABSTRACT

A method of recognizing a location of a user including detecting the user's two eyes and mouth of their face is provided, which includes calculating a ratio of a distance between the two eyes to a distance between a middle point of the two eyes and the mouth, calculating a rotation angle of the face according to the ratio, and detecting a distance between the face and the camera based on the rotation angle.

20 Claims, 10 Drawing Sheets

FIG. 3
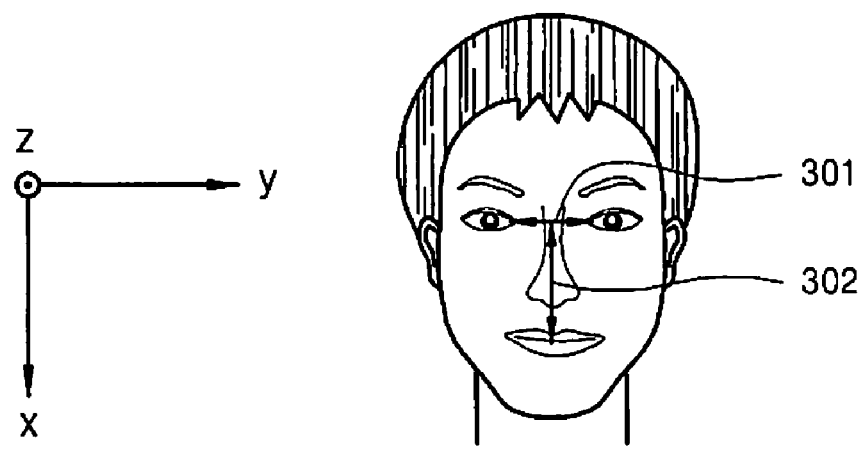
FIG. 4
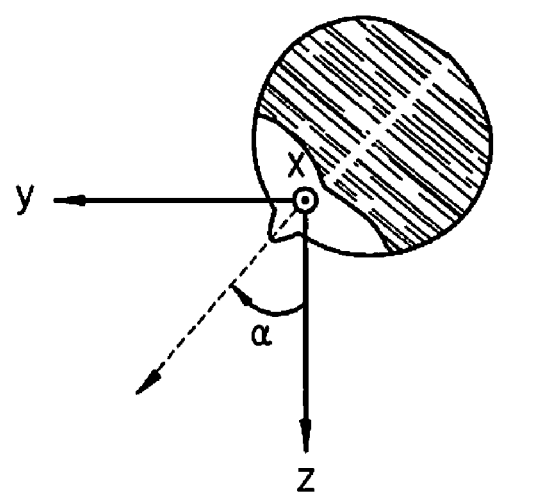
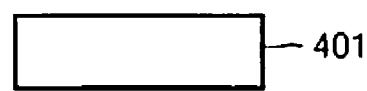

| RATIO | ROTATION ANGLE (°) |
|---|---|
| 0.42 | 45 |
| 0.60 | 30 |
| 0.76 | 10 |
| 0.88 | 0 |
| 0.90 | -10 |
| 1.00 | -30 |
| 1.20 | -45 |

FIG. 7

| DISTANCE BETWEEN MEAUSURED TWO EYES (cm) | ROTATION ANGLE (°) | DISTANCE BETWEEN TWO VIRTUAL EYES (cm) |
|---|---|---|
| 4.5 | 45 | 6 |
| | 30 | 5.5 |
| | 10 | 5 |
| | 0 | 4.5 |
| | -10 | 4.5 |
| | -30 | 4.5 |
| | -45 | 4.5 |
| 3 | 45 | 4 |
| | 30 | 5.5 |
| | 10 | 3.2 |
| | 0 | 3 |
| | -10 | 3 |
| | -30 | 3 |
| | -45 | 3 |

FIG. 8

| DISTANCE BETWEEN TWO VIRTUAL EYES (cm) | DISTANCE FROM CAMERA (m) |
|---|---|
| 6 | 1 |
| 4.5 | 2 |
| 3 | 3 |
| 2 | 4 |

METHOD AND APPARATUS FOR RECOGNIZING LOCATION OF USER

PRIORITY

This application claims priority under 35 U.S.C. §119(a) to Korean Patent Application No. 10-2010-0043058, filed on May 7, 2010, in the Korean Intellectual Property Office, the disclosure of which is incorporated herein by reference.

BACKGROUND OF THE INVENTION

1. Field of the Invention

The present invention generally relates to a method and apparatus for recognizing a location of a user, and more particularly, to a method and apparatus for recognizing a location of a user using a single camera.

2. Description of the Related Art

In order to acquire information about a current location of a user, camera hardware using a stereo method, a Time of Flight (TOF) method, or the like is generally used. However, since such methods require calibration and matching, the camera hardware using these methods are greatly affected by illumination. Also, when applied to consumer electronics, the camera hardware required for these methods hinders their price competitiveness.

SUMMARY OF THE INVENTION

The present invention provides a method and apparatus for accurately recognizing a location of a user using a single camera.

According to an aspect of the present invention, there is provided a method of recognizing a location of a user using a camera, the method including detecting two eyes and a mouth of the user's face; calculating a ratio of a distance between the two eyes to a distance between a middle point of the two eyes and the mouth; calculating a rotation angle of the face according to the ratio; and detecting a distance between the face and the camera based on the rotation angle.

The method may further include generating a zoom-in signal or a zoom-out signal with respect to the face based on the distance between the face and the camera.

The method may further include a zoom-in signal or a zoom-out signal with respect to contents displayed on an image display device connected to the camera based on the distance between the face and the camera.

The method may further include a signal for changing a location of an image display device connected to the camera based on the rotation angle.

The method may further include calculating an angle between a line connecting the two eyes and a reference line, wherein, when it is assumed that the user directly faces the camera, the reference line refers to a line connecting two virtual eyes.

The method may further include generating a signal for rotating contents displayed on an image display device connected to the camera based on the angle between the line connecting the two lines and the reference line.

The method may further include a signal for changing a location of an image display device connected to the camera based on the angle between the line connecting the two eyes and the reference line.

According to another aspect of the present invention, there is provided an apparatus for recognizing a location of a user using a camera, the apparatus including a detecting unit that detects two eyes and a mouth of the user's face; and a calculating unit that calculates a ratio of a distance between the two eyes to a distance between a middle point of the two eyes and the mouth, calculates a rotation angle of the face according to the ratio, and calculates a distance between the face and the camera based on the rotation angle.

BRIEF DESCRIPTION OF THE DRAWINGS

The above and other features and advantages of the present invention will become more apparent from the following detailed description taken in conjunction with the accompanying drawings, in which:

FIG. 3 is a view for explaining a ratio of a distance between two eyes to a distance between a middle point of the two eyes and mouth, according to an embodiment of the present invention;

FIGS. 4 and 5 illustrate rotation angles of a face according to embodiments of the present invention;

FIG. 6 illustrates a first lookup table according to an embodiment of the present invention;

FIG. 7 illustrates a second lookup table according to an embodiment of the present invention;

FIG. 8 illustrates a third lookup table according to an embodiment of the present invention;

DETAILED DESCRIPTION OF EMBODIMENTS OF THE PRESENT INVENTION

Figure 1:
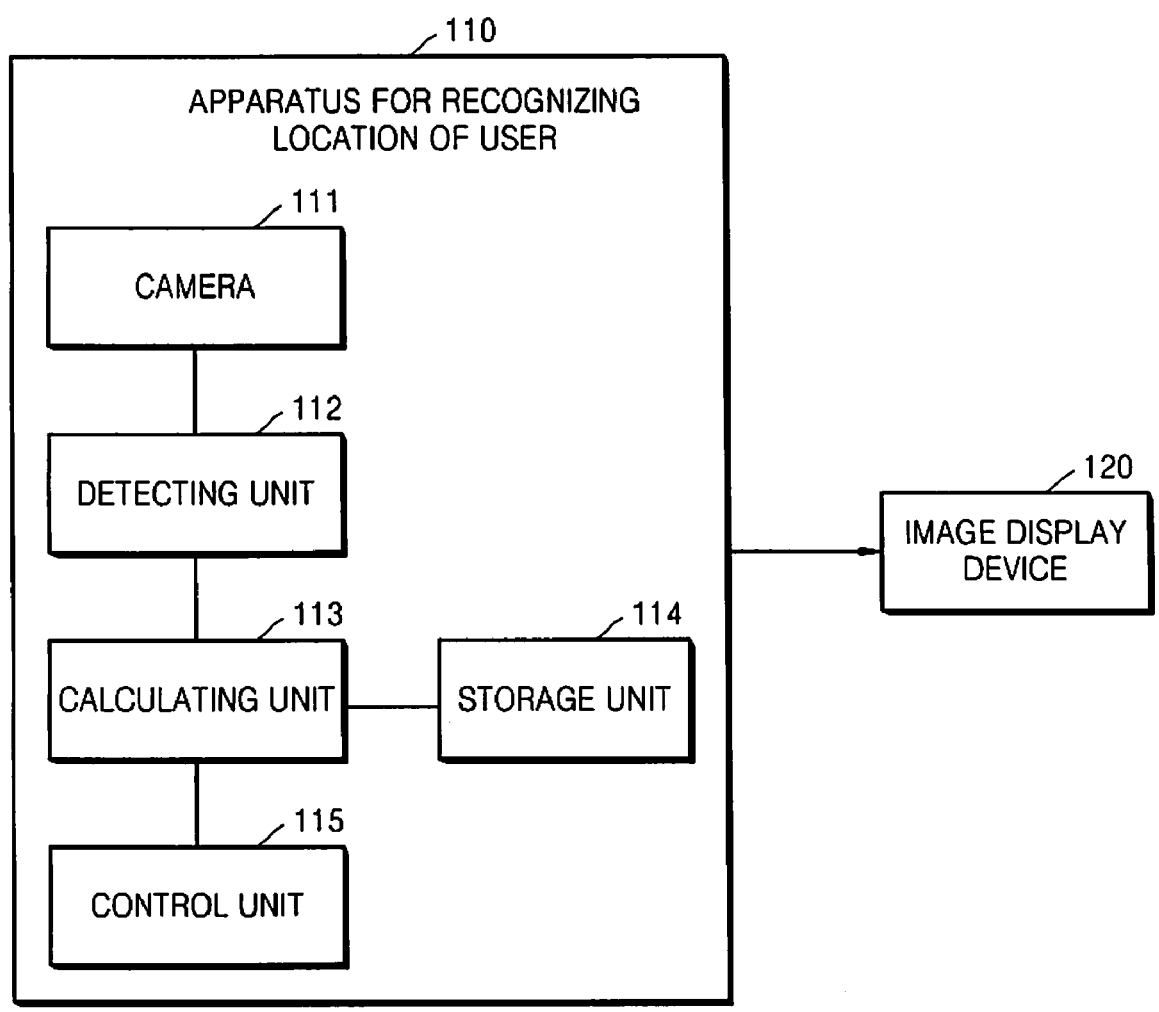
FIG. 1 is a block diagram of an apparatus for recognizing a location of a user, according to an embodiment of the present invention.

The present invention will now be described more fully with reference to the accompanying drawings, in which embodiments of the invention are shown. Embodiments disclosed in the specification and structures shown in the drawings are merely exemplary of the present invention, and it should be understood that variations capable of substituting for the embodiment may exist at the time of filing the application.

FIG. 1 is a block diagram of an apparatus 110 for recognizing a location of a user, according to an embodiment of the present invention.

Referring to FIG. 1, the apparatus 110 includes a camera 111, a detecting unit 112, a calculating unit 113, a storage unit 114, and a control unit 115. In a hardware configuration, the detecting unit 112, the calculating unit 113, the storage unit 114, and the control unit 115 may be included in the camera 111. Also, the apparatus 110 may be embedded in an image display device 120.

The camera 111 captures an image of the user who is a subject to be processed, and the detecting unit 112 detects the two eyes and mouth of the user.

The calculating unit 113 calculates a distance between the two eyes and a distance between a middle point of the two eyes and the mouth. Next, the calculating unit 113 calculates a ratio of the distance between the two eyes to the distance between the middle point of the two eyes and the mouth, calculates a rotation angle of a face according to the ratio, and detects a distance between the face and the camera 111 based on the rotation angle.

More specifically, the calculating unit 113 calculates a rotation angle of a face by using a first lookup table in which a predetermined rotation angle according to a calculated ratio is stored, calculates a distance between two virtual eyes by using a second lookup table in which information obtained by converting the distance between the two eyes into a distance between two virtual eyes when the user directly faces the camera 111 is stored, and detects a distance between the face and the camera 111 by using a third lookup table in which a real separation distance between the face and the camera 111 according to the distance between the two virtual eyes is stored.

A distance between two virtual eyes refers to a distance between two eyes when it is assumed that a user directly faces the camera 111. Also, the calculating unit 113 calculates an angle between a line connecting the two eyes and a line connecting the two virtual eyes when it is assumed that the user directly faces the camera 111.

The storage unit 114 stores the first lookup table, the second lookup table, and the third lookup table.

The control unit 115 generates a zoom-in signal or a zoom-out signal with respect to the user's face based on the distance between the user's face and the camera 111. Also, the control unit 115 may generate and transmit a zoom-in signal or a zoom-out signal with respect to contents displayed on the image display device 120 or a signal for changing a location of the image display device 120, based on the distance between the user's face and the camera 111. Also, the control unit 115 generates and transmits a signal for rotating contents displayed on the image display device 120 or a signal for changing a location of the image display device 120, based on an angle between a line connecting the user's two eyes and a reference line.

A detailed explanation of each element will be made with reference to FIGS. 2 through 13 below.

Figure 2:
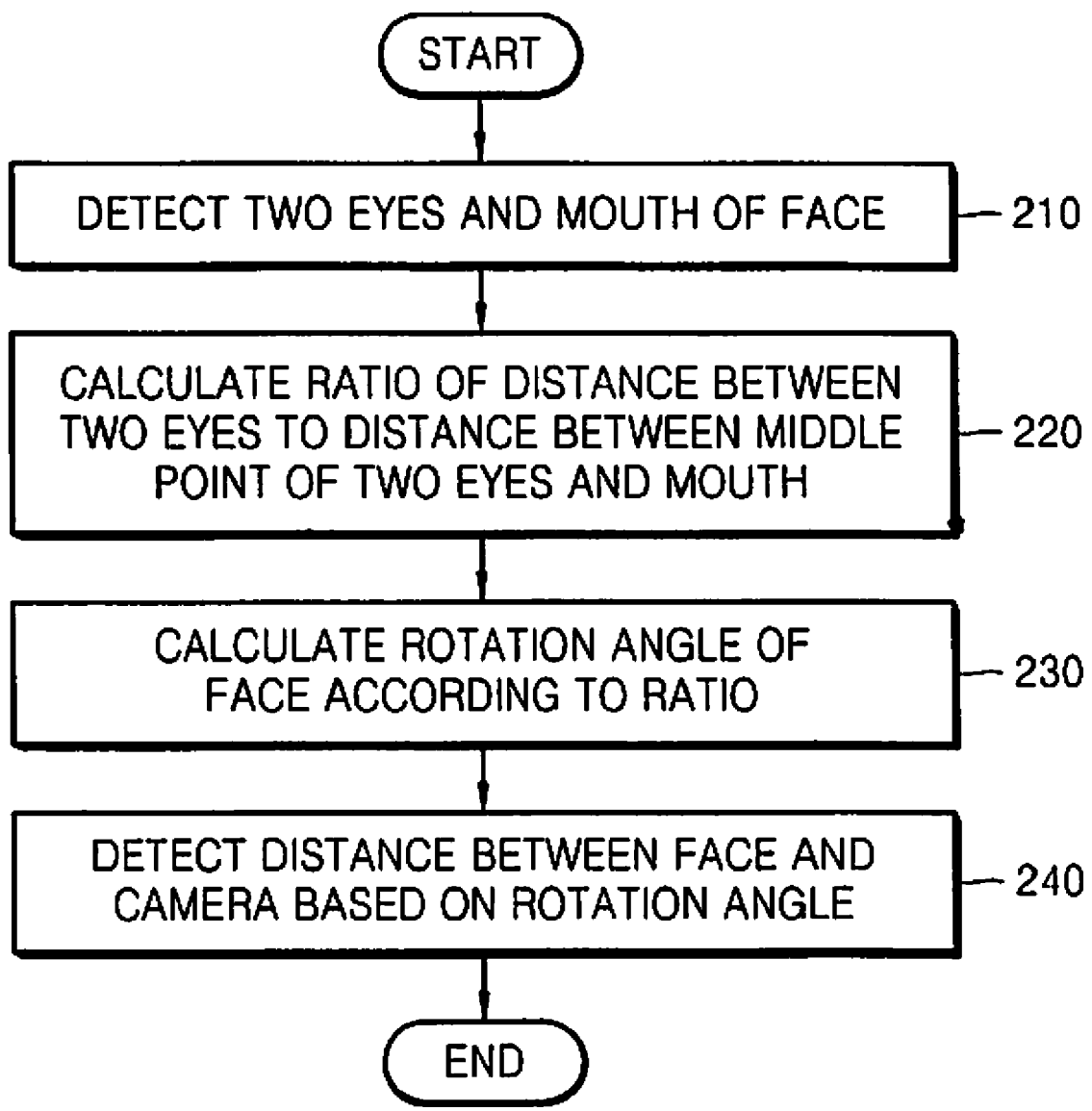
FIG. 2 is a flowchart illustrating a method of recognizing a location of a user, according to an embodiment of the present invention.

FIG. 2 is a flowchart illustrating a method of recognizing a location of a user, according to an embodiment of the present invention.

Referring to FIG. 2, in step 210, the detecting unit 112 detects the two eyes and mouth of a face of a user who is a subject to be processed by using the camera 111. The detecting unit 112 may detect the user by performing motion detection on an image captured by the camera 111 and skin detection in an area where a motion is detected. After detecting the user, the detecting unit 112 detects a head, and detects the two eyes and mouth of the head.

In step 220, the calculating unit 113 calculates a ratio of a distance between the two eyes to a distance between a middle point of the two eyes and the mouth. First, the calculating unit 113 calculates a distance between the two eyes and a distance of a middle point of the two eyes, that is, the glabella, and the mouth. Next, the calculating unit 113 calculates a ratio of the distance between the two eyes to the distance between the glabella and the mouth. The ratio is obtained by dividing the distance between the two eyes by the distance between the glabella and the mouth. A distance between the glabella and the mouth when the user lowers his/her head may be less than a distance between the glabella and the mouth when the user directly faces the camera 111, and a distance between the two eyes when the user turns his/her head may be less than a distance between the two eyes when the user directly faces the camera 111.

FIG. 3 is a view for explaining a ratio of a distance between two eyes to a distance between the glabella and mouth, according to an embodiment of the present invention. Referring to FIG. 3, an x-axis represents a vertical direction related to a distance between the glabella and mouth, a y-axis represents a horizontal direction related to a distance between eyes on the front of a face, and a z-axis represents a direction in which the camera 111 is looked at. In FIG. 3, a ratio refers to a ratio of a distance 301 between two eyes to a distance 302 between the glabella and mouth.

In step 230, the calculating unit 113 calculates a rotation angle of the face based on the ratio. The calculating unit 113 compares the ratio with a reference ratio to obtain a comparison result, and calculates a rotation angle of the face of the user according to the comparison result. In the present embodiment, the reference ratio refers to a ratio of a distance between two real eyes of the average person to a distance between a middle point of the two eyes and mouth. In general, a distance between the two eyes of a person is 6 to 7 cm, and a ratio of the distance between the two eyes to a distance between the glabella and mouth is constantly 0.88. Although there are differences in the ratio, it is assumed in the present embodiment that the ratio is fixed at 0.88. While the ratio may vary according to the user or manufacturer, the ratio is a fixed value when compared with other ratios. Further, the calculating unit 113 calculates a ratio of a distance between the two eyes to a distance between the glabella and mouth, and calculates a rotation angle by referring to a first lookup table about a rotation angle according to a ratio, which is stored in the storage unit 114.

Figures 5, 6:
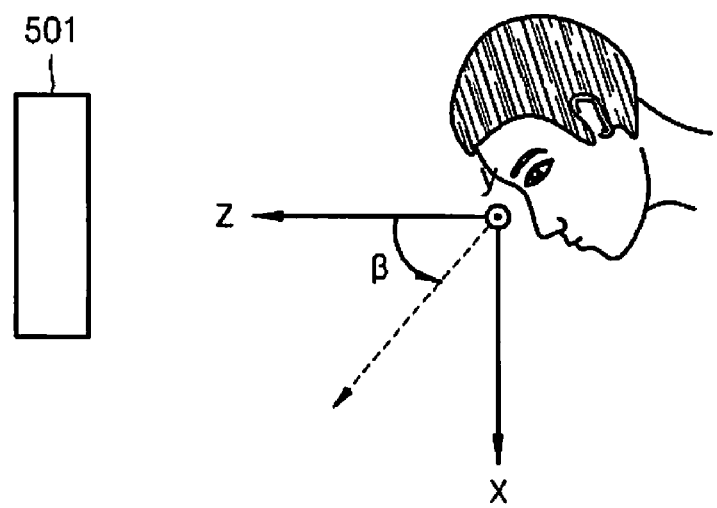

FIGS. 4 and 5 illustrates rotation angles of a face according to embodiments of the present invention. FIG. 6 is a view illustrating a first lookup table showing a ratio and a rotation angle according to the ratio, according to an embodiment of the present invention.

FIG. 4 illustrates a case where a user turns his/her head from a camera 401. A distance between the two eyes measured by the camera 401 when the user turns his/her head from the camera 401 is less than a distance between the two eyes measured by the camera 401 when the user directly faces the camera 401, and a distance between the glabella and mouth when the user turns his/her head from the camera 401 is not different from a distance between the glabella and mouth when the user directly faces the camera 401. Accordingly, a calculated ratio is lower than a reference ratio (for example, 0.88). Referring to FIG. 6, ratios are 0.42, 0.60, and 076, and rotation angles α are 45°, 30°, and 10°, respectively. Whether the user turns his/her head to the right or to the left, a rotation angle is a positive value.

FIG. 5 illustrates a case where a user lowers his/her head from a camera 501. A distance between the two eyes measured by the camera 501 when the user lowers his/her head is not different from a distance between the two eyes measured by the camera 501 when the user directly faces the camera 501. A distance between the glabella and mouth when the user lowers his/her head is less than a distance between the glabella and mouth when the user directly faces the camera 501. Accordingly, a calculated ratio is greater than a reference ratio (for example, 0.88). Referring to FIG. 6, ratios are 0.90, 1.00, and 1.20, and rotation angles β are −10°, −30°, and −45°, respectively. Whether the user lowers or raises his/her head, a rotation angle is a negative value. Examples of positive and negative values of a rotation angle are shown in FIGS. 4 and 5, but may be arbitrarily set by a manufacturer.

In step 240, the calculating unit 113 detects a distance between the face and the camera 111 based on the rotation angle. The calculating unit 113 calculates a distance between two virtual eyes when it is assumed that the user directly faces the camera 111 by using a distance between two calculated real eyes, a calculated rotation angle, and a second lookup table stored in the storage unit 114. The second lookup table shows information obtained by converting a distance between the two eyes into a distance between two virtual eyes when the user directly faces the camera based on the calculated rotation angle. Next, the calculating unit 113 detects a distance between the face and the camera 111 using the distance between the two virtual eyes and a third lookup table. The third lookup table shows a real separation distance between the face and the camera 111 according to the distance between the two virtual eyes.

FIGS. 7 and 8 illustrate a second lookup table and a third lookup table, respectively, according to an embodiment of the present invention. For example, when it is assumed that a ratio measured when a user turns his/her head as shown in FIG. 4 is 0.42, a rotation angle α is calculated by using the first lookup table to be 45°, and when a distance between two measured real eyes is 4.5 cm, a distance between two virtual eyes is calculated by using the second lookup table to be 6 cm, and a distance between a real person and the camera 111 is detected by using the third lookup table to be 1 m. When it is assumed that a ratio measured when a user lowers his/her head is calculated to be 1.00 as shown in FIG. 5, a rotation angle β is calculated by using the first lookup table to be −30°, when a distance between two measured real eyes is 4.5 cm, a distance between two virtual eyes is calculated by using the second lookup table to be 4.5 cm, and a distance between a real person and the camera 111 is detected by using the third lookup table to be 2 m. Although examples of the first through third lookup tables are shown in FIGS. 6 through 8, values of the lookup tables may be determined experimentally.

Figure 9:
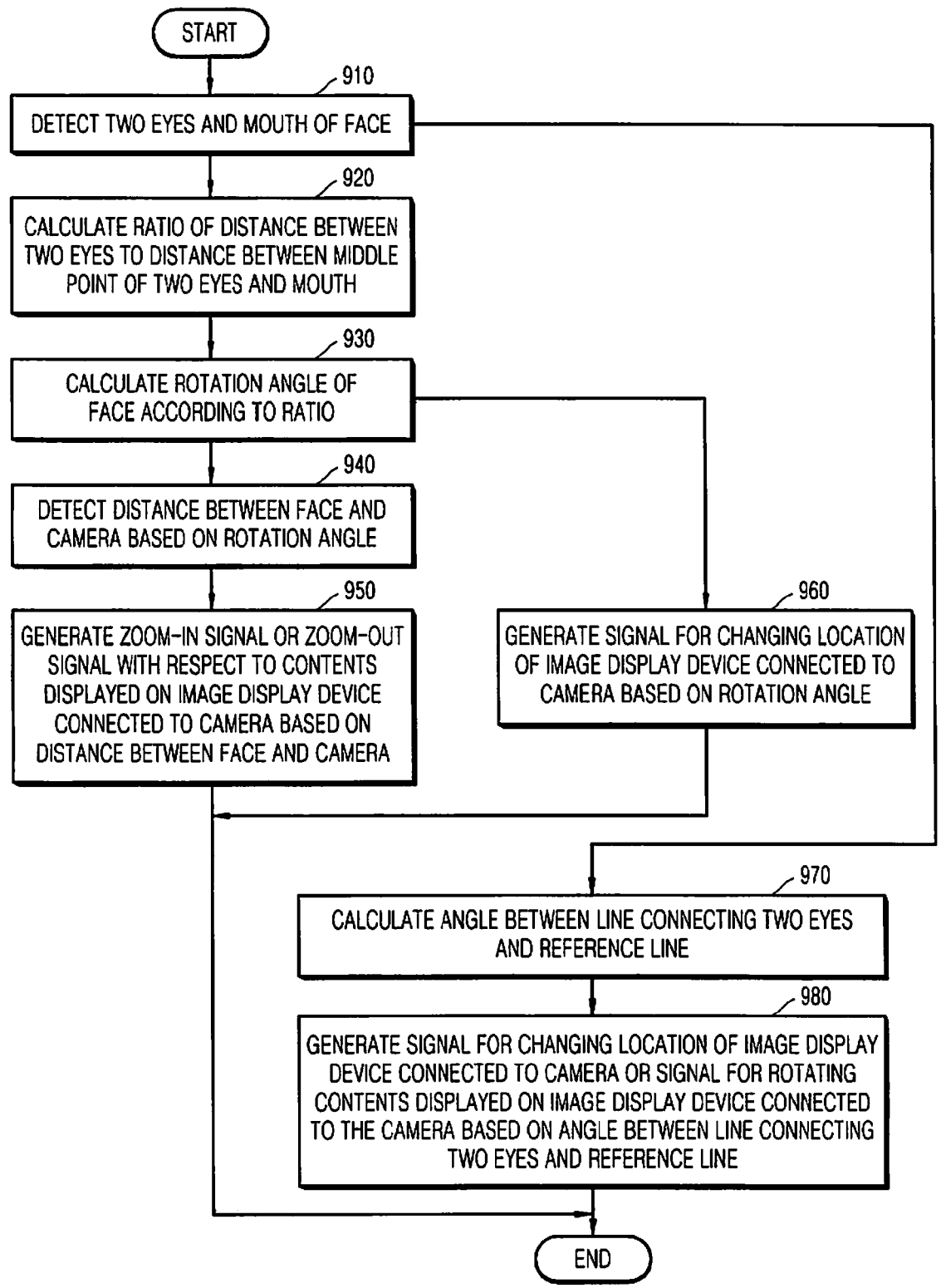
FIG. 9 is a flowchart illustrates a method of recognizing a location of a user, according to another embodiment of the present invention.

FIG. 9 is a flowchart illustrating a method of recognizing a location of a user, according to an embodiment of the present invention.

Referring to FIG. 9, steps 910 through 940 are similar to steps 210 through 240 of FIG. 2, and thus, an explanation thereof will not be given.

In step 950, the control unit 115 generates a zoom-in signal or a zoom-out signal with respect to contents displayed on the image display device 120 based on the distance between the user's face and the camera 111. The control unit 115 generates the zoom-in signal or the zoom-out signal with respect to the contents so as to provide the contents with an optimal size to a viewer of the image display device 120 and transmits the zoom-in signal or the zoom-out signal to the image display device 120, according to the distance between the user's face and the camera 111. Next, the image display device 120 zooms in or out from the contents according to the zoom-in signal or the zoom-out signal which the image display device 120 receives. Also, the control unit 115 may generate a zoom-in signal or a zoom-out signal with respect to the user's face and zoom in or out from the camera 111, based on the distance between the face and the camera 111.

In step 960, the control unit 115 generates a signal for changing a location of the image display device 120 connected to the camera 111 based on the rotation angle calculated in operation 930. If the user of the image display device 120 turns his/her head, the control unit 115 may rotate the image display device 120 by generating a signal for laterally rotating the image display device 120 based on the rotation angle. Next, the image display device 120 is rotated based on the signal, which the image display device 120 receives.

Figure 13:
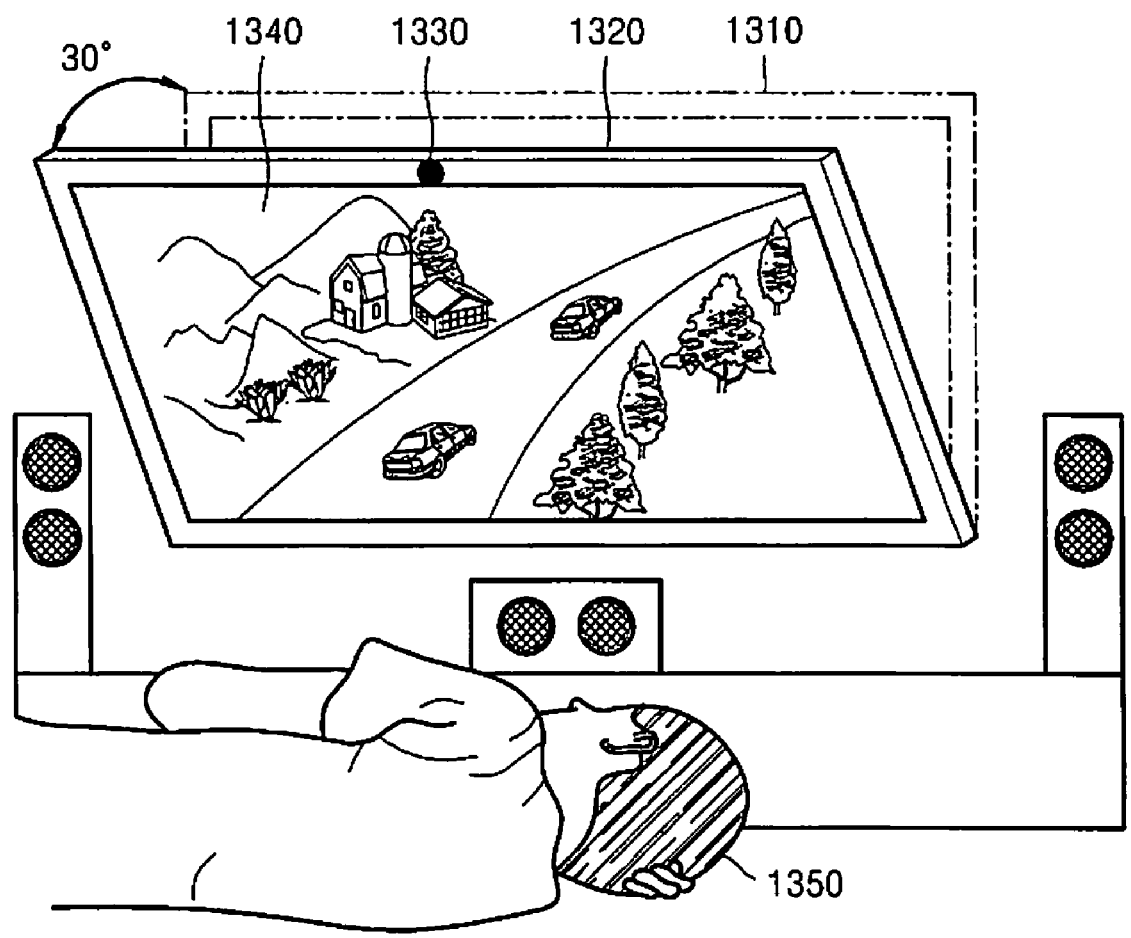
FIG. 13 illustrates a rotation of an image display device according to a rotation angle, according to an embodiment of the present invention.

FIG. 13 illustrates a rotation of an image display device 1320 according to a rotation angle of a face of a viewer 1350, according to an embodiment of the present invention. Referring to FIG. 13, the size of contents may be adaptively changed by a zoom-in signal or a zoom-out signal according to a distance between the face of the viewer 1350 and a single camera 1330. Also, referring to FIG. 13, a location of the image display device 1320 is changed from a location of an original image display device 1310 in such a manner that the image display device 1320 is moved forward by a predetermined angle, according to a rotation angle α or β of the face of the viewer 1350.

In step 970, the calculating unit 113 calculates an angle between a line connecting the two eyes and a reference line. The reference line refers to a line connecting two virtual eyes when it is assumed that the user directly faces the camera 111. That is, if the user lowers only his/her head, since the user still directly faces the camera 111, the rotation angle α or β is not changed. Accordingly, the ratio is constant.

Figure 10:
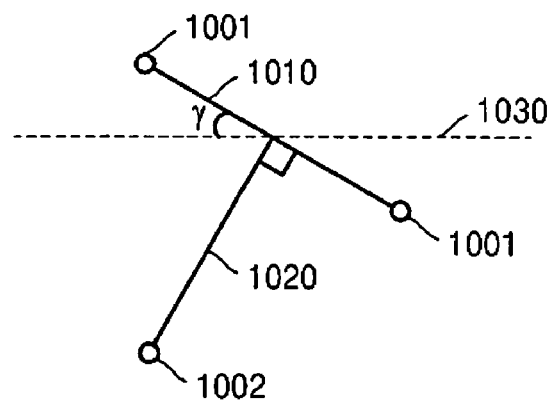
FIG. 10 illustrates an angle between a line connecting the two eyes and a reference line, according to an embodiment of the present invention.

FIG. 10 illustrates an angle between a line connecting the two eyes 1001 and a reference line 1030, according to an embodiment of the present invention.

Referring to FIG. 10, the calculating unit 113 calculates an angle γ between a line 1010 connecting the two eyes 1001 and the reference line 1030.

In step 980, the control unit 115 generates a signal for changing a location of the image display device 120 or a signal for rotating contents displayed on the image display device 120 based on an angle between a line connecting the two eyes and a reference line. Next, the control unit 115 transmits the generated signal to the image display device 120 or a device for controlling a location of the display device 120.

Figure 11:
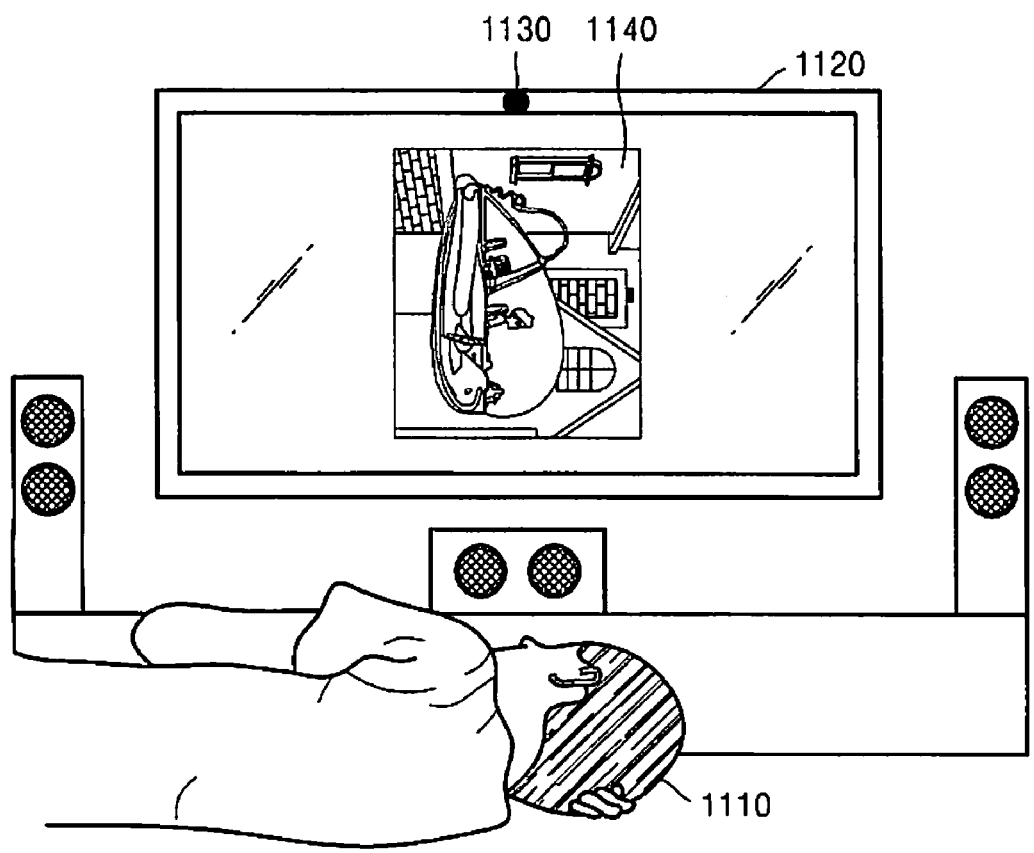
FIGS. 11 and 12 illustrate rotations of contents and an image display device according to an angle between a line connecting the two eyes and a reference line, according to embodiments of the present invention.
Figure 12:
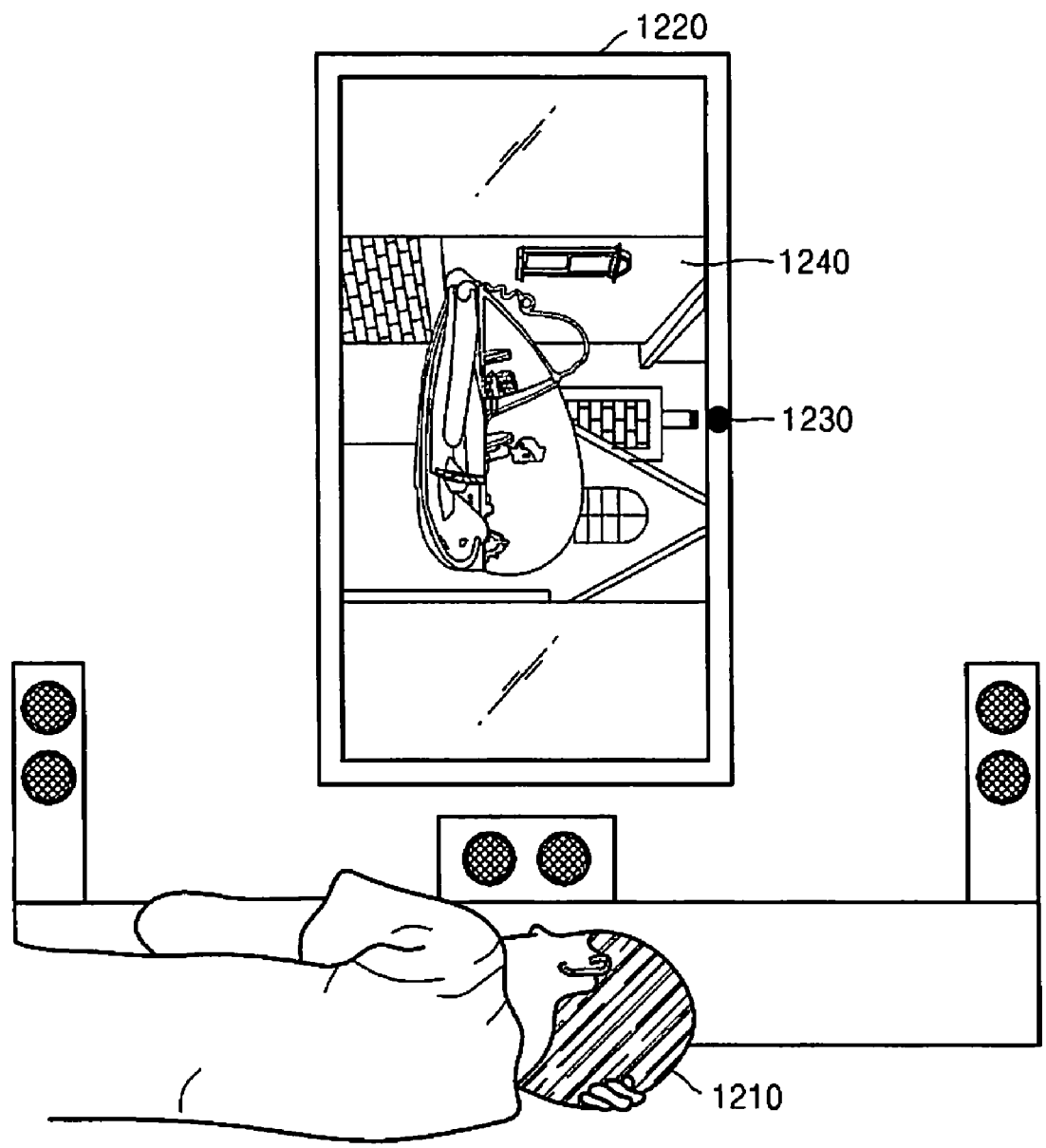

FIGS. 11 and 12 illustrate rotations of contents and the image display device 120 according to an angle between a line connecting the two eyes and a reference line, according to embodiments of the present invention.

Referring to FIG. 11, when a viewer 1110 of an image display device 1120 lies flat to view contents 1140, an angle γ between a line connecting the two eyes and a reference line is about 90°, and a control unit generates a signal for rotating the contents 1140 by about 90°. In FIG. 12, a signal for rotating an image display device 1220, that is, hardware itself, by about 90° is generated. Also, in FIG. 11, the size of the contents 1140 is reduced by a zoom-out signal according to a distance between a face of the viewer 1110 and a single camera 1130.

According to the one or more embodiments of the present invention, even when a face rotates, since a separation distance between a camera and a user may be accurately calculated using a single camera unlike in a stereo method requiring two or more cameras, costs may be reduced and calibration may not be necessary.

According to the one or more embodiments of the present invention, an interaction effect with contents may be obtained through a camera embedded in an image display device. For example, interactions with a user, such as a rotation of hardware, a link due to a lateral movement of contents, a change in the size of contents due to zoom-in or out of the contents, is achieved.

Also, a tracking system may be realized by estimating a location of a user in an image entering from a surveillance video system and operating a Pan Tilt Zoom (PTZ) camera to directly zoom in and out.

The present invention may be embodied as computer-readable codes in a computer-readable recording medium. The computer-readable recording medium may be any recording apparatus capable of storing data that is read by a computer system. Examples of the computer-readable recording medium include Read-Only Memories (ROMs), Random-Access Memories (RAMs), CD-ROMs, magnetic tapes, floppy disks, and optical data storage devices. The computer-readable recording medium may be a transitory or a non-transitory carrier wave that transmits data via the Internet, for example. The computer-readable recording medium may be distributed among computer systems that are interconnected through a network, and the present invention may be stored and implemented as computer-readable codes in the distributed system. Functional programs, codes, and code segments embodying the present invention may be easily derived by programmers in the technical field to which the present invention pertains.

The embodiments of the present invention have been particularly shown and described. The image sensors according to the embodiments may be applied to, for example, a light-sensitive touch panel, a digital camera, a camcorder, a mobile phone, and a portable electronic device. However, it will be understood by one of ordinary skill in the art that the embodiments should be considered in a descriptive sense only and not for purposes of limitation, and various changes in form and details may be made therein without departing from the spirit and scope of the one or more embodiments of the present invention as defined by the following claims.

What is claimed is:

1. A method of recognizing a location of a user using a camera, the method comprising:
    detecting two eyes and a mouth of the user's face;
    calculating a ratio of a distance between the two eyes to a distance between a middle point of the two eyes and the mouth;
    calculating a rotation angle of the face according to the ratio; and
    detecting a distance between the face and the camera based on the rotation angle.

2. The method of claim 1, wherein calculating the rotation angle comprises:
    comparing the ratio with a reference ratio to obtain a comparison result; and
    calculating a rotation angle of the face of the user according to the comparison result,
    wherein the reference ratio refers to a fixed ratio of a distance between two real eyes of a person to a distance between a middle point of the two real eyes and the mouth.

3. The method of claim 2, wherein detecting the distance between the face and the camera comprises:
    calculating, if it is assumed that the user directly faces the camera, a distance between two virtual eyes based on the rotation angle; and
    detecting a distance between the face and the camera based on the distance between the two virtual eyes.

4. The method of claim 3, wherein calculating the rotation angle of the face comprises calculating the rotation angle by using a first lookup table in which information about a predetermined rotation angle according to the ratio is stored,
    calculating the distance between the two virtual eyes comprises calculating the distance between the two virtual eyes by using a second lookup table in which predetermined information obtained by converting the distance between the two eyes into a distance between two virtual eyes when the user directly faces the camera is stored, and
    detecting the distance between the face and the camera comprises detecting the distance between the face and the camera by using a third lookup table in which information about a real separation distance between the face and the camera according to the distance between the two virtual eyes is stored.

5. The method of claim 3, further comprising generating a zoom-in signal or a zoom-out signal with respect to the face based on the distance between the face and the camera.

6. The method of claim 3, further comprising a zoom-in signal or a zoom-out signal with respect to contents displayed on an image display device connected to the camera based on the distance between the face and the camera.

7. The method of claim 2, further comprising a signal for changing a location of an image display device connected to the camera based on the rotation angle.

8. The method of claim 1, further comprising calculating an angle between a line connecting the two eyes and a reference line,
    wherein, when it is assumed that the user directly faces the camera, the reference line refers to a line connecting two virtual eyes.

9. The method of claim 8, further comprising generating a signal for rotating contents displayed on an image display device connected to the camera based on the angle between the line connecting the two eyes and the reference line.

10. The method of claim 8, further comprising a signal for changing a location of an image display device connected to the camera based on the angle between the line connecting the two eyes and the reference line.

11. An apparatus for recognizing a location of a user using a camera, the apparatus comprising:
    a detecting unit that detects two eyes and a mouth of the user's face; and
    a calculating unit that calculates a ratio of a distance between the two eyes to a distance between a middle point of the two eyes and the mouth, calculates a rotation angle of the face according to the ratio, and calculates a distance between the face and the camera based on the rotation angle.

12. The apparatus of claim 11, wherein the calculating unit compares the ratio with a reference ratio to obtain a comparison result, and calculates the rotation angle of the face of the user according to the comparison result, and
    wherein the reference ratio refers to a fixed ratio of a distance between two real eyes of a person to a distance between a middle point of the real two eyes and the mouth.

13. The apparatus of claim 12, wherein the calculating unit calculates, when it is assumed that the user directly faces the camera, a distance between two virtual eyes based on the rotation angle, and detects a distance between the face and the camera based on the distance between the two virtual eyes.

14. The apparatus of claim 13, further comprising a storage unit that stores a first lookup table in which information about a predetermined rotation angle according to the ratio is stored, a second lookup table in which information obtained by converting the distance between the two eyes based on the rotation angle into a distance between two virtual eyes when the user directly faces the camera is stored, and a third lookup table in which information about a real separation distance between the face and the camera according to the distance between the two virtual eyes is stored, wherein the calculating unit calculates the rotation angle by using the first lookup table, calculates the distance between the two virtual eyes by using the second lookup table, and detects the distance between the face and the camera by using the third lookup table.

15. The apparatus of claim 13, further comprising a control unit that generates a zoom-in signal or a zoom-out signal with respect to the face based on the distance between the face and the camera.

16. The apparatus of claim 13, further comprising a control unit that generates a zoom-in signal or a zoom-out signal with respect to contents displayed on an image display device connected to the camera based on the distance between the face and the camera.

17. The apparatus of claim 12, further comprising a control unit that generates a signal for changing a location of an image display device connected to the camera based on the rotation angle.

18. The apparatus of claim 11, wherein the calculating unit calculates an angle between a line connecting the two eyes and a reference line, and
wherein, when it is assumed that the user directly faces the camera, the reference line refers to a line connecting two virtual eyes.

19. The apparatus of claim 18, further comprising a control unit that generates a signal for rotating contents displayed on an image display device connected to the camera based on the angle between the line connecting the two eyes and the reference line.

20. The apparatus of claim 18, further comprising a control unit that generates a signal for changing a location of an image display device connected to the camera based on the angle between the line connecting the two eyes and the reference line.

* * * * *